United States Patent
Nambiar et al.

(10) Patent No.: US 8,271,361 B2
(45) Date of Patent: Sep. 18, 2012

(54) CHANGE ORDER TEMPLATE FOR PURCHASE ORDER DOCUMENT AMENDMENT

(75) Inventors: Shibhu Nambiar, Annandale, VA (US); Suman Guha, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 473 days.

(21) Appl. No.: 12/388,307

(22) Filed: Feb. 18, 2009

(65) Prior Publication Data

US 2010/0211482 A1 Aug. 19, 2010

(51) Int. Cl.
*G07B 17/00* (2006.01)
*G06Q 30/00* (2012.01)
(52) U.S. Cl. ............................................ 705/30; 705/26
(58) Field of Classification Search ...................... 705/30
See application file for complete search history.

(56) References Cited

U.S. PATENT DOCUMENTS

| | | | |
|---|---|---|---|
| 6,539,386 B1 * | 3/2003 | Athavale et al. ...................... 1/1 |
| 7,096,189 B1 * | 8/2006 | Srinivasan .................... 705/7.25 |
| 2002/0178021 A1 * | 11/2002 | Melchior et al. ................... 705/1 |
| 2003/0126024 A1 * | 7/2003 | Crampton et al. .............. 705/22 |
| 2007/0106560 A1 * | 5/2007 | Shields ........................... 705/26 |
| 2007/0203803 A1 * | 8/2007 | Stone et al. ..................... 705/26 |
| 2010/0106546 A1 * | 4/2010 | Sproule .............................. 705/7 |

OTHER PUBLICATIONS

"Business Process Document", GeorgiaFirst, document generation date Apr. 16, 2008.*
PeopleSoft EnterpriseOne—Revising a Procurement Document obtained at https://financial.gmis.in.gov/SOI/Pur/B4_PU_030.doc; 5 pages, Feb. 12, 2009.
BearingPoint—Project Aspire Conversion/Interface Functional Design obtained at http://www.fldfs.com/aadir/projectaspire/Resource_Documents/Functional_Specifications/p2p/087%20MFMP%20-%20PO%20Changes%20and%20Cancellations%20R4%20Final%20FSM5.pdf; 7 pages, Feb. 12, 2009.
PeopleSoft Navigation—Change a Purchase Order obtained at http://www.sparemouse.com/Portfolio/CSC_Education_Services/Pursell_Work/PSSupport/PS_UserGuide/po/05_manage_purchase_orders/05d_purchase_change_orders.htm; 6 pages, Feb. 12, 2009.
Georgia First—Business Process Document "Creating PO Change Orders" obtained at http://www.mcg.edu/peoplesoft/documents/PO_020_220-CreatingPOChangeOrders_BUSPROC.doc; 5 pages, Jun. 15, 2006.

(Continued)

*Primary Examiner* — Garcia Ade
(74) *Attorney, Agent, or Firm* — Trellis IP Law Group, PC

(57) ABSTRACT

Particular embodiments provide for a user configurable purchase order template. A list of attributes for a purchase order template may be created and output to a user. The user may then select which attributes in the list are internal attributes or external attributes. After the purchase order document has been approved by the supplier and the purchaser, changes may be necessary. When a change is desired, the system determines if the changed attribute is an external attribute or an internal attribute. If the changed attribute is an external attribute, the external entity may be contacted for approving the change. After the external entity has approved the change, the purchase order may be amended. If the changed attribute is an internal attribute, the attribute may be changed without contacting the external entity. If the change is an internal change, then the purchase order may not be amended, but an internal change relating to the purchase order may be made.

19 Claims, 6 Drawing Sheets

OTHER PUBLICATIONS

State of Indiana—Purchasing Training Manual obtained at http://www.das.state.ne.us/nis/trainingmanuals/810_training_manuals/proc/101_PR_WI_L8_T1.a_Revising_a_Purchasing_Document.pdf; 5 pages, Feb. 12, 2009.

Official Nebraska Government Website—Purchasing Document Revisions obtained at http://www.das.state.ne.us/nis/flashmemos/procure/revise_proc_doc_new.htm; 2 pages, Mar. 3, 2006.

Change an Existing Purchase Order obtained at http://web.mitedu/sapr3/windocs/bpors05m.htm; 15 pages, Jul. 13, 2006.

Aestiva Purchase Order obtained at http://www.aestiva.com/pages/htmlos/products-purchase_order-modules.html; 3 pages, Feb. 12, 2009.

* cited by examiner

Fig. 4

CHANGE ORDER TEMPLATE FOR PURCHASE ORDER DOCUMENT AMENDMENT

BACKGROUND

Particular embodiments generally relate to processing order changes.

A purchase order is a document that governs an agreement between a purchaser and a supplier. A purchase order document requires approval. Once the purchase order document has been approved, the supplier can provide the goods or services governed by the purchase order. However, at some point, changes to attributes related to the purchase order may need to be made. Some changes to attributes may require amendments to the purchase order document and some changes may not. A distributor of the software that was used to create the purchase order document may hard code which attributes require communication of changes to the supplier. This may lead to a discrepancy between the purchaser and the supplier as to which changes should be communicated to the supplier. If the expectations for certain amendments to be communicated to the supplier are different between the purchaser and the supplier, this may lead to contractual risk and also unnecessary communication.

SUMMARY

Particular embodiments provide for a user configurable purchase order template. A list of attributes for a purchase order template may be created and output to a user. The user may then select which attributes in the list are internal attributes or external attributes. An internal attribute is where a change to the attribute does not need to be communicated to the supplier whereas an external attribute is where a change to the attribute needs to be communicated to the supplier.

After the purchase order document has been approved by the supplier and the purchaser, changes may be necessary. When a change is desired, a change order form for the purchase order document is used to change an attribute to the purchase order document. When the change order form is received, the system determines if the changed attribute is an external attribute or an internal attribute. If the changed attribute is an external attribute, the external entity may be contacted for approving the change. After the external entity has approved the change, the purchase order document may be amended. If the changed attribute is an internal attribute, the attribute may be changed without contacting the external entity. Also, an internal change relating to the purchase order document may be made.

A further understanding of the nature and the advantages of particular embodiments disclosed herein may be realized by reference of the remaining portions of the specification and the attached drawings.

BRIEF DESCRIPTION OF THE DRAWINGS

FIG. 4 depicts an example interface for submitting a change order according to one embodiment.

DETAILED DESCRIPTION OF EMBODIMENTS

Figure 1:
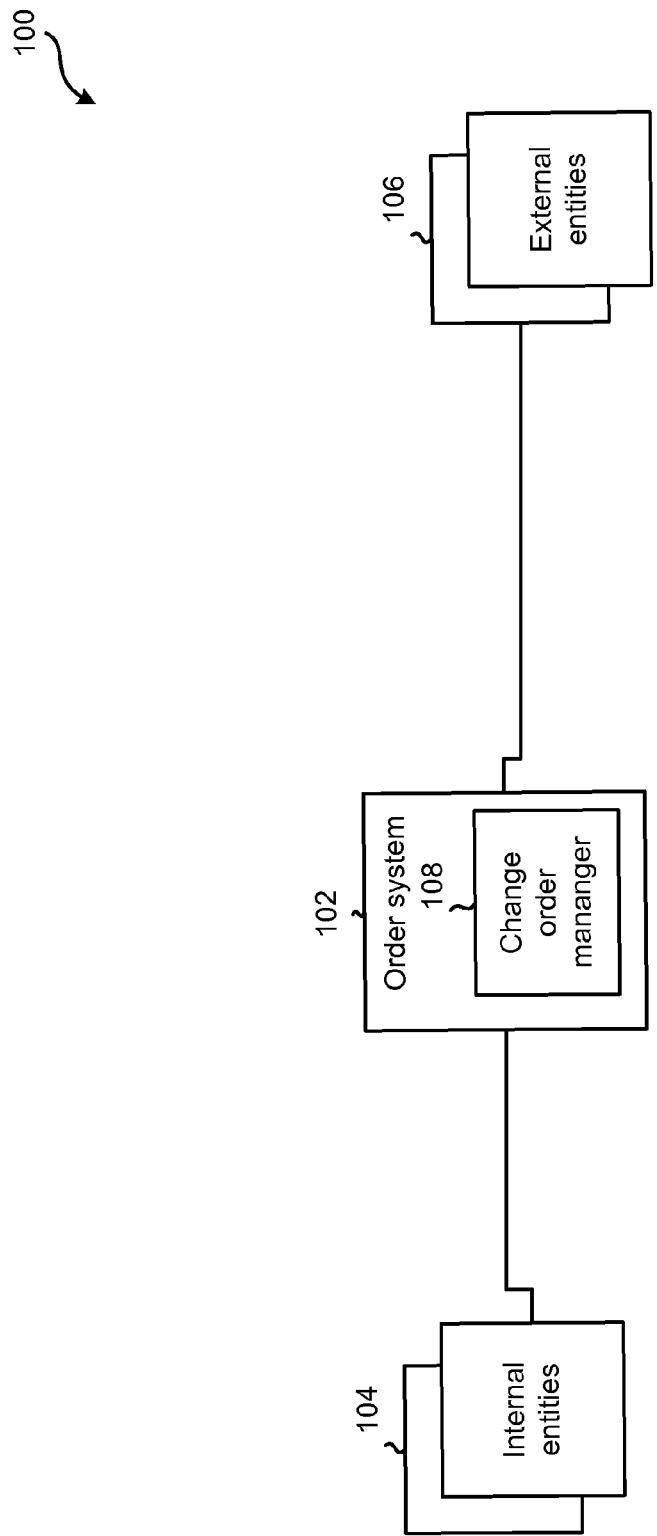
FIG. 1 depicts a system for providing changes to purchase orders according to one embodiment.

FIG. 1 depicts a system 100 for providing changes to purchase orders according to one embodiment. As shown, an order system 102, internal entities 104 and external entities 106 are provided.

Internal entities 104 may be an entity or party that is the owner of software that creates the purchase order document. For example, an internal entity may be the purchaser of the goods or services. An external entity 106 is an external party, such as a supplier that can provide the goods or services. Internal entity 104 and external entity 106 may be different companies, different divisions of the same company, or have other relationships. The difference between internal and external is the side of the contract (purchaser or supplier).

Order system 102 provides a change order template that includes attributes in which a user can define which attributes constitute an internal change or an external change. When a change is made, a change order manager 108 determines if the change is an internal change or an external change. If the change is an external change, external entities 106 may be notified to procure their approval of the change. If the change is an internal change, the change may be made without contacting external entities 106.

The changes relate to a purchase order document, which may be any agreement between an internal entity 104 and external entity 106. The agreement may be a contract for supplying goods or services. For example, a purchaser may order goods from a supplier. Also, a person skilled in the art may appreciate other forms of purchase orders.

The purchase order document may be created using order system 102. Order system 102 includes software that lists attributes that may be included in a purchase order document. Users can input information for the attributes and a purchase order document is created. The document then goes through an approval process. Sending a purchase order to external entity 106 constitutes a legal offer to buy products or services. Acceptance of a purchase order by external entity 106 usually forms a one off contract between internal entity 104 and external entity 106 so no contract exists until the purchase order is accepted. For example, the purchase order document is sent to external entity 106 for approval and then the approved purchase order document is acknowledged by internal entity 104. This forms a contract. Because of the formality of the purchase order document, a process to change the purchase order document is needed. For example, a change order form is submitted and may need to be approved before being acted upon. The changes requested in the change order form need to be analyzed to determine whether they are external or internal changes.

Different entities may have varied and diverse requirements about what define and constitute an internal change or external change. An internal change is where a change to the attribute does not need to be communicated to the external entity whereas an external change is where a change to the attribute needs to be communicated to the external entity. Because the change needs to be communicated to the supplier, this causes revision to be incremented on the document. The internal change may change an attribute in the purchase document that does not affect the external entity. For example, the internal change is an administrative change that may not affect the goods or services that external entity 106 is providing. The internal change is a change that modifies internal controls on the document and need not be communicated to external entity 106 and hence does not cause revision to be incremented. The internal change may change internal control attributes that will not be shown to external entity 106 when they view the purchasing document. External entity 106 may only be able to see those attributes that are relevant to them and would cause an amendment/external change.

The purchase order document includes the terms of the order and may be a legal document. Thus, some changes to the language may need to be communicated to external entity 106. However, administrative changes may not affect the terms of the purchase order document and thus may not need to be communicated to external entity 106.

Change order manager 108 uses a change order template that allows internal entities 104 to define which attributes of a purchase order are internal changes or external changes. A user can create a change order template definition, which defines which attributes constitute an external change or an internal change. Whenever a change to a purchase order document is received, change order manager 108 can determine if a change is an external change or an internal change. When an external change is determined, change order manager 108 may contact external entities 106 for approval. After approval, the purchase order document may be amended and a new version is saved. If the change is determined to be an internal change, the external entity 106 may not contacted because the change may not amend the purchase order document.

Figure 2:
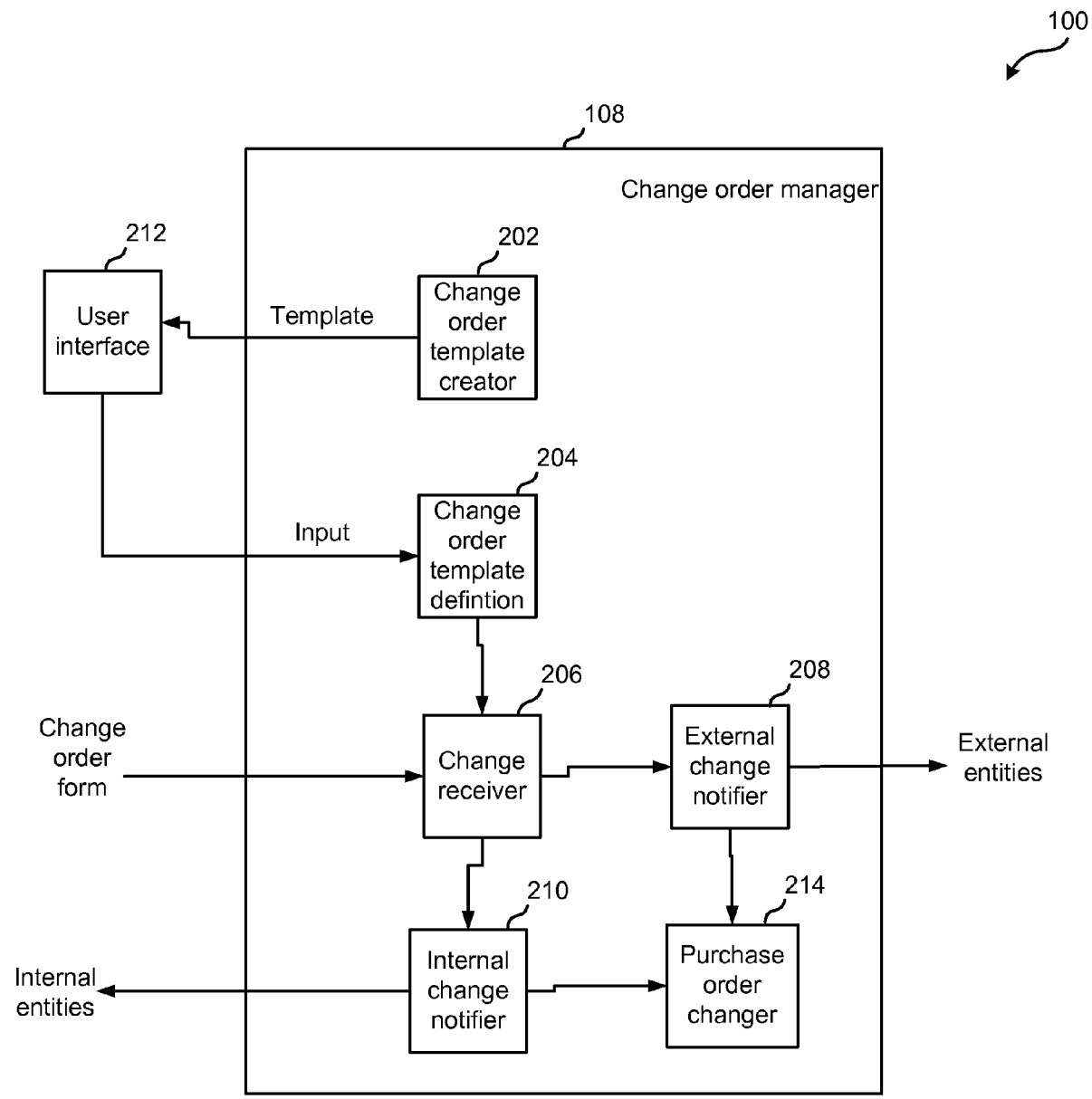
FIG. 2 depicts a more detailed example of the system according to one embodiment.

FIG. 2 depicts a more detailed example of system 100 according to one embodiment. Change order manager 108 includes a change order template creator 202, a change receiver 206, an external change notifier 208 and an internal change notifier 210.

Change order template creator 202 receives purchase order attributes. The attributes may be any attributes that may be included in purchase order documents. For example, internal entities 104 may use order system 102 to create multiple purchase order documents with different external entities 106. All the attributes that may be included in the purchase order documents may be received at change order template creator 202.

Change order template creator 202 may output the change order template on user interface 212. The change order template may list the attributes that allow a user to define which attributes are internal changes and external changes. This allows a user to configure which attributes are internal and external on any purchase orders. The configuration may be made before a purchase order document is created, after, or during.

Figure 3:
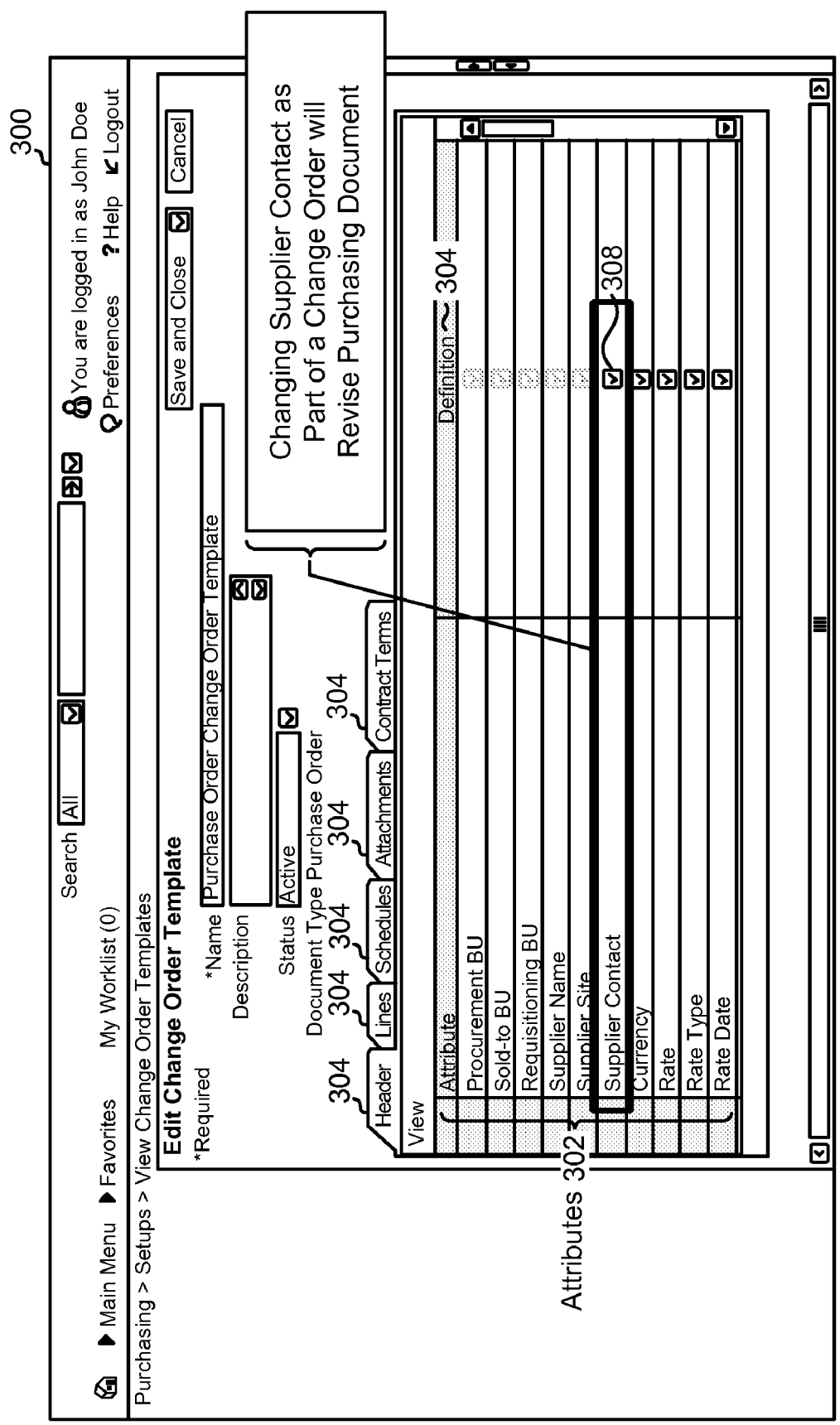
FIG. 3 depicts an example of an interface of a change order template according to one embodiment.

FIG. 3 depicts an example of an interface 300 of a change order template according to one embodiment. As shown, a list of attributes 302 is provided. The list may be categorized to make finding the attributes easier. For example, tabs 304 are provided to categorize different attributes. A definition column 306 is provided to allow a user to specify which attributes are external changes or internal changes. For example, a user may select a check box 308 to indicate that the attribute is an external change. The external change may be where the purchase order document needs to be revised if the attribute is changed. Once the attributes have been defined as internal changes or external changes, the user may save and close the template.

Referring back to FIG. 2, a change order template definition 204 is created. The definition indicates which attributes are internal or external changes. For example, the definition may be used for all of the purchase order documents that are created for internal entity 104. Also, different definitions may be created for different purchasing document types for different divisions of the internal entity. Further, different definitions may be created for different purchase order document, different external entities 106, etc. For example, three kinds of purchasing document internal entity 104 can create: a Purchase Order, a Blanket Purchase Agreement (BPA), and a Contract Purchase Agreement (CPA). A purchase order is a commercial document issued by a buyer to a seller, indicating the type, quantities and agreed prices for products or services the seller will provide to the buyer. A blanket purchase agreement is a simplified method of filling anticipated repetitive needs for supplies or services. Both the BPA and CPA are long term agreements. A BPA is created when the buying organization knows what item they need to procure over long period of times but do not know when they would need it, such as office supplies, raw material for manufacturing etc. A CPA is created when the buying organization does not know about the specific goods/service that they need but knows that they would need the services of the service provider, such as a contract with an advertisement firm. Other types of purchasing agreements may also be appreciated.

The attributes set on a change order template is governed by these three document types. Internal entities 104 can create any number of change order definitions but they are associated to one of the document types and a Procurement Business Unit combination. A Procurement business unit may be a division of an internal entity involved with the function of procuring goods and services. By categorizing the change order definitions, different divisions of a company can standardize use of the change order definitions. Thus, the attributes on a single purchase order document may be customizable. This may be helpful because different agreements interpret attributes differently.

Purchase order documents may be created using order system 102. Different values are inserted into the document for the attributes. For example, the number of items ordered, the name of the external entity, the price, and other items may be inserted.

After a purchase order document has been created and approved, changes to the purchase order may be performed. For example, a user may input a change to a purchase order that is received at change receiver 206. The inputted change may be submitted as a change order form, which is a document that outlines a desired change. A change order form may list the changes that are found on the document. The change order form has not changed the actual purchase order document but may request a change. Change receiver 206 uses the change order template definition 204 to determine if the change should be classified as an internal change or an external change. For example, when the change order form is received, the change order form is defined as an external change order or an internal change order. FIG. 4 depicts an example interface 400 for submitting a change order according to one embodiment. As shown, different attributes of a purchase order are provided. A user may modify one of the attributes. For example, a user may modify a supplier contact attribute 402. When the change order is submitted, change receiver 206 may analyze which attributes have been changed. Depending on which attributes have been changed, the change order may be defined as an internal change order or an external change order.

Change receiver 206 determines which attributes should be classified as external changes. For example, change receiver 206 determines which definition corresponds to the purchase order document. Different information may be used to determine which definition to use, such as the purchase order document may include an identifier to the definition to use. In one embodiment, the identifier includes the document type of the purchase order document and the procurement business unit on which the purchase order document was created. Both of these attributes are specified on the purchase order document. Change receiver 206 is configured to compare attributes that are changed to the definition to determine if the changed attributes are external or internal changes.

External change notifier 208 is then used to notify an external entity 106 of the change. In one example, a message including the change to the purchase order document is generated and sent to external entity 106 for approval. The purchase order document may not be officially amended at this time. Rather, a summary of the proposed changes or a sample of the changes in a purchase order document is sent. However, the change may not become official (by saving a new version) until approval is received.

If a change is considered an internal change, internal change notifier 210 may notify an internal party of the change. In one example, the internal party may need to approve the change. In other examples, the internal party does not need to approve the changes. Attributes causing an internal change may be masked from external entities on a purchase order document. For example, the administrative change may be changing an attribute that designates where the goods should be routed internally, but does not need approval from external entity 106 and can be hidden from external entity 106.

Once the changes have been approved, a purchase order changer 214 may amend the purchase order. For example, the purchase order is amended and assigned a new revision number when the change is an external change. If the change is an internal change, the purchase order revision number may not be incremented.

In one embodiment, a change order may include multiple changes. For example, multiple attributes may be changed that may be both internal and external changes. In one example, if a change order includes an external change, then the change order is defined as an external change order. The changes may be sent to external entity 106 for approval. The internal changes, however, may be masked if desired. Also, changes to attributes may be separated and only attributes that have been defined as external changes are sent to external entities 106.

Figure 5:
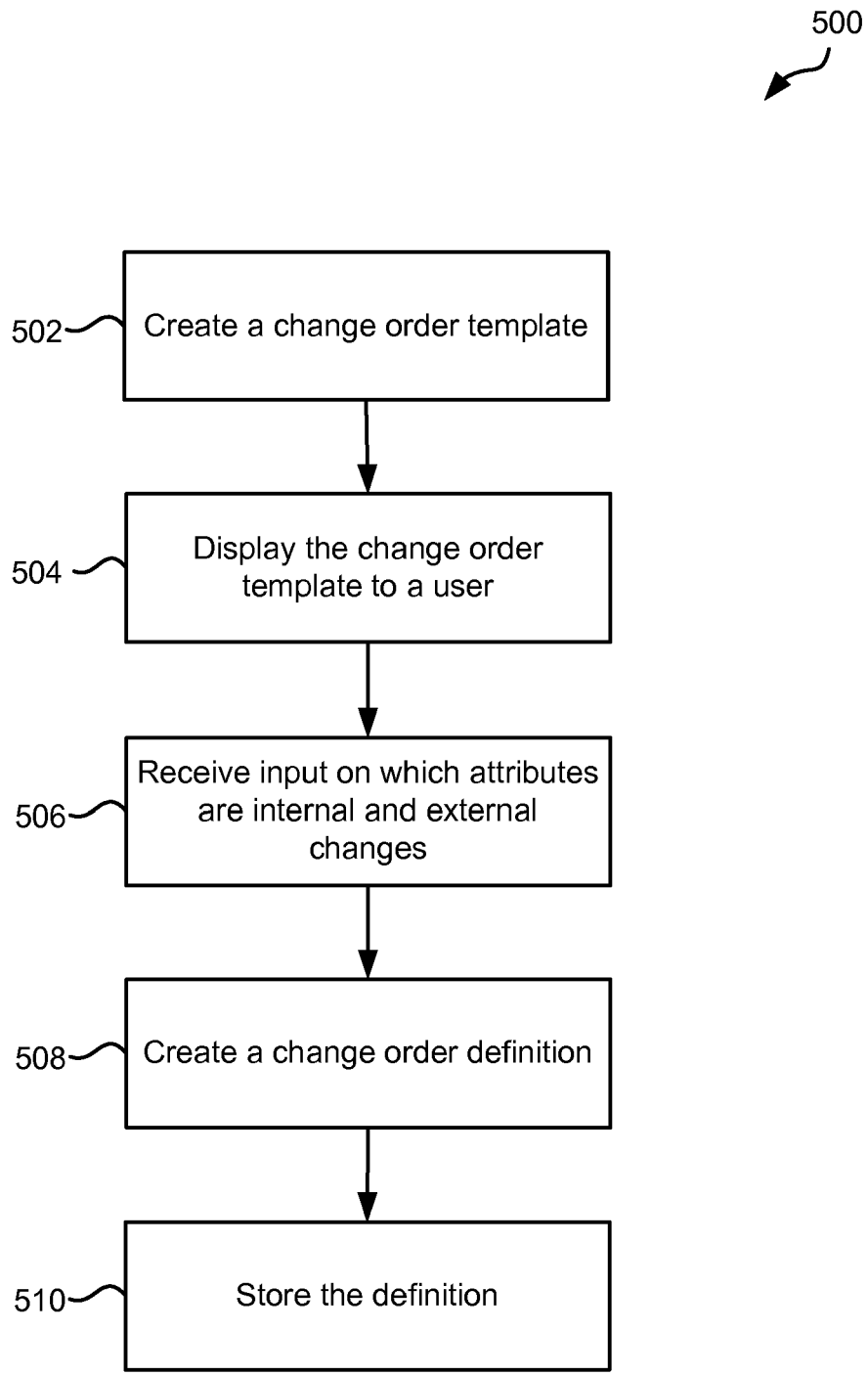
FIG. 5 depicts a simplified flowchart of a method for creating a change order definition.

FIG. 5 depicts a simplified flowchart 500 of a method for creating a change order definition. Step 502 creates a change order template. The change order template may include a list of attributes that may be changed in different purchase orders.

Step 504 displays the change order template to a user. This allows a user to customize which attributes may be considered internal changes or external changes. This is different from a static list of attributes that are defined by the provider of the purchase order software. For example, different entities may consider different attributes as internal changes or external changes. Also, on different purchase order documents, some attributes may be considered external and then internal for other purchase order agreements documents. By allowing the user to define which attributes are external and which are internal, the change order process may be more efficient.

Step 506 receives input on which attributes are internal and external changes. Step 508 then creates a change order definition. The definition may specify which attributes are internal or external changes. Step 510 then stores the definition. The definition may be associated with different purchase order documents or a subset of purchase order documents as described above. For example, the definition may be associated with a type of purchase order and a business division, certain external entities 106, certain purchase order documents that have been created, or certain purchase order documents that may be created.

Figure 6:
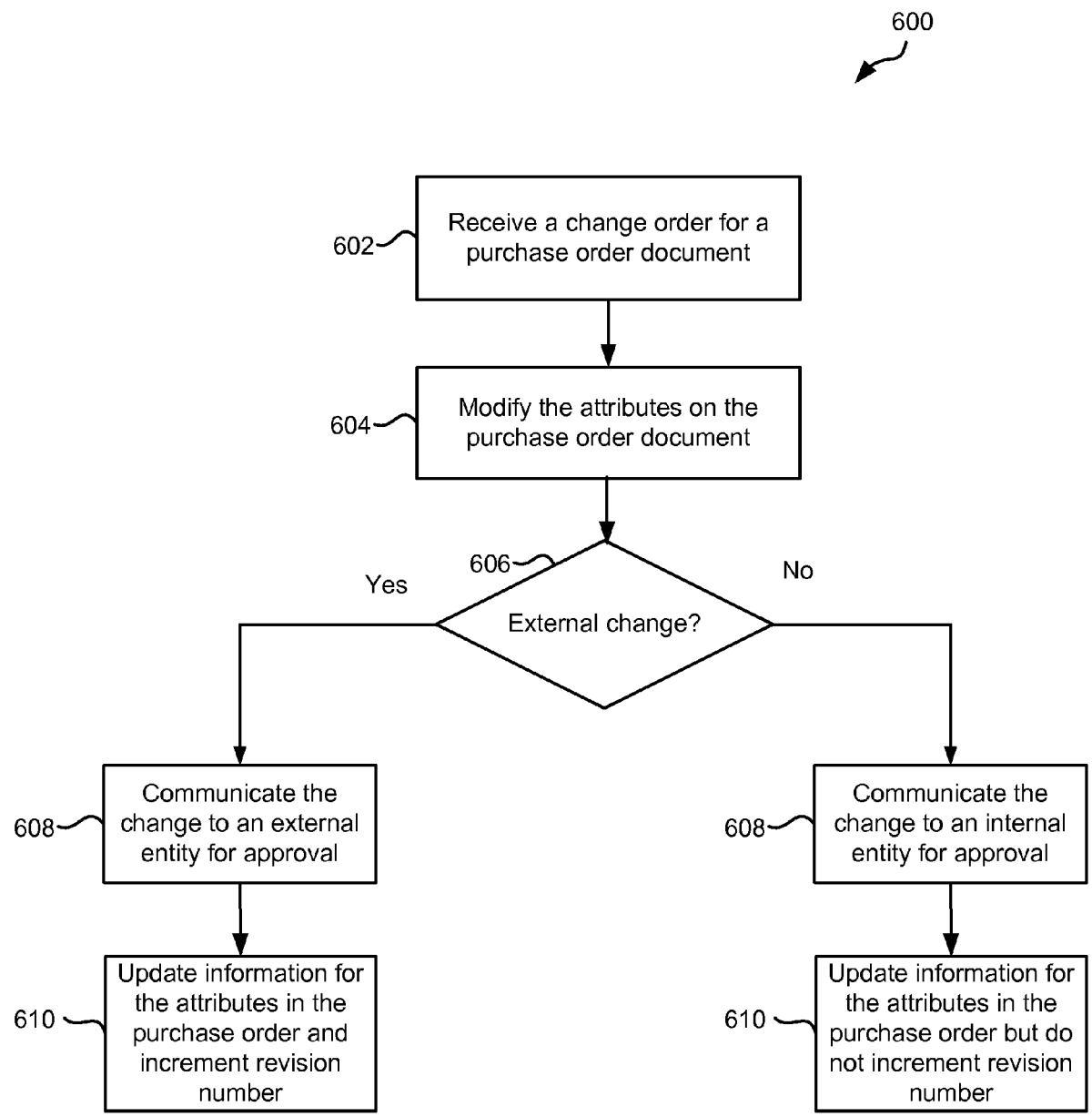
FIG. 6 depicts a simplified flowchart of a method for processing change orders according to one embodiment.
Figure 1:
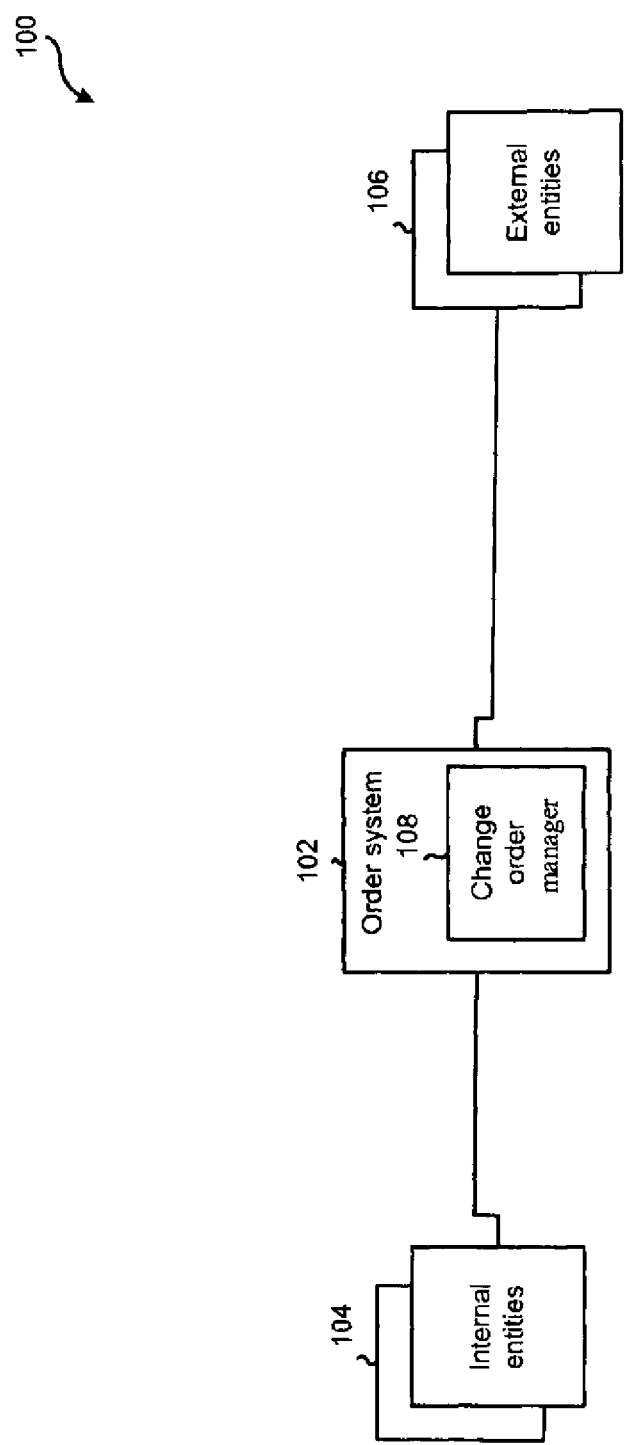

Once the change order definition is created, change orders may be processed for the purchase order document. FIG. 6 depicts a simplified flowchart 600 of a method for processing change orders according to one embodiment.

Step 602 receives a change order form for a purchase order document. The change order form may change information for certain attributes.

Step 604 modifies the attributes for the purchase order document. Modifying the attributes may be modifying metadata for the attributes or storing the changes. The purchase order document may not have been formally amended at this time. Then, step 606 determines if the change is an external change. If the change is an external change, step 608 communicates the change to an external entity 106 for approval. In step 610, the information for the attributes in the purchase order document is updated and the purchase order document is revised. Also, the a revision number may be incremented. However, if the change is not an external change, step 612 may communicate the change to an internal division for approval. In some cases, approval is not needed for making the internal change, however. Step 614 then updates the purchase order document, but does not increment the revision number of the document. The revision number is not incremented because the change does not need to be communicated to external entity 106 because the change is not considered a formal amendment to the document and hence the change is not communicated to the external entity 106. Also, in some cases internal approval may be needed for the external change but may not be necessary.

Particular embodiments provide many advantages. For example, flexibility is provided to identify what constitutes an external versus an internal change. By being able to customize which changes are external, unnecessary communication to external entities 106 is limited. For example, only changes that have been agreed upon to be external may be communicated. The specification as to which attributes are external changes may be made as described above. This type of customization allows for a more efficient change order process.

Although the description has been described with respect to particular embodiments thereof, these particular embodiments are merely illustrative, and not restrictive. Although purchase orders are discussed, it will be understood that other documents may be used.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

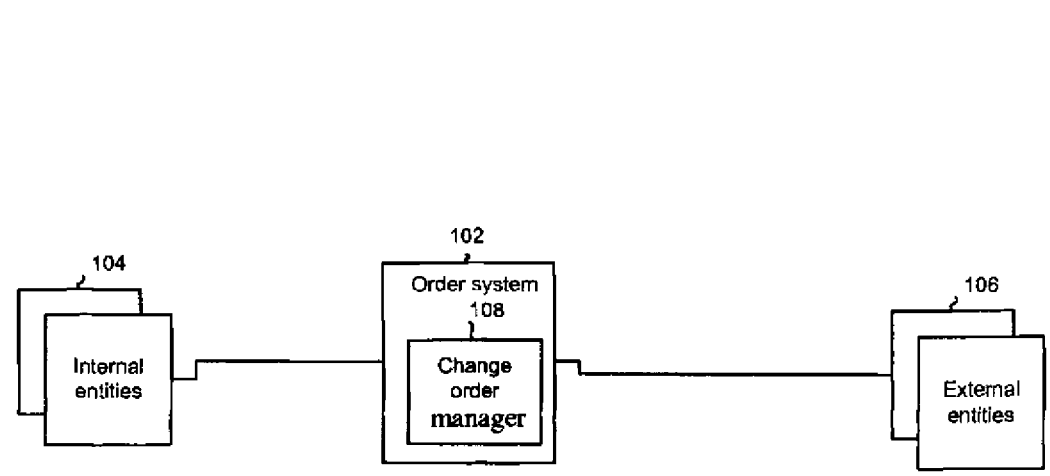

We claim:

1. A method comprising:
rendering a plurality of attributes for one or more purchase orders on a display, with the one or more purchase orders defining terms of a contract between an external entity and an internal entity;
receiving input from a user interface associating the plurality of attributes as one of an internal attribute or an external attribute;
receiving a change order indicating a change to one of the plurality of attributes;
identifying, using one or more processors, whether the change corresponds to the external attribute or the internal attribute, with the external attribute including information of the terms of the contract; and
transmitting a notification to the external entity of a modification of the terms of the contract and request approval of the modification in response to identifying that the change corresponds to the external attribute.

2. The method of claim 1 further comprising changing the purchase order to include the change in response to receiving approval from the external entity, defining a modified purchase order.

3. The method of claim 2, further comprising incrementing a revision number for the purchase order in response to changing the purchase order.

4. The method of claim 1 wherein receiving further includes receiving the change order indicating a plurality of changes to a plurality of the attributes with a first subset of the plurality of changes corresponding to the internal attribute and further including receiving approval from the internal entity for changes of the first subset and changing the internal attribute for the purchase order to reflect the changes of the first subset.

5. The method of claim 4 further including changing the purchase order to include the change in response to receiving approval from the external entity and approval from the internal entity to include the changes to the plurality of attributes, defining a modified purchase order and transmitting the modified purchase order to the external entity without including information correspond to changes corresponding to the first subset.

6. The method of claim 1, wherein an internal attribute is an attribute that is internal to the internal entity and the external attribute is an attribute external to the internal entity.

7. The method of claim 1, further comprising:
providing a change order form allowing a user to alter attributes of the purchase order document.

8. The method of claim 1, further comprising:
saving the input from the user in a change order definition;
determining the change order definition based on the change order received;
analyzing the change order to determine whether altered attributes are external attributes or internal attributes based on the change order definition.

9. The method of claim 1, wherein the change order template can be selectively applied to different purchase orders.

10. The method of claim 1, further comprising:
creating a plurality of change order template definitions configured to identify the attributes that are internal or external; and
applying different change order template definitions to different purchase order.

11. The method of claim 10, wherein a change order definition in the plurality of change order definitions is associated with a type of purchase order and a business unit, wherein a purchase order created in the business unit and being the type of purchase order is automatically associated with the change order definition.

12. The method of claim 11, wherein the type is selected from a set of types consisting essentially of a purchase order, a blanket purchase agreement, and a contract purchase agreement.

13. A computer-readable medium comprising encoded logic for execution by the one or more processors, the logic executable for:
rendering a plurality of attributes for one or more purchase orders on a display, with the one or more purchase orders defining terms of a contract between an external entity and an internal entity;
receiving input from a user interface associating the plurality of attributes as one of an internal attribute or an external attribute;
receiving a change order indicating a change to one of the plurality of attributes;
identifying, using one or more processors, whether the change corresponds to the external attribute or the internal attribute, with the external attribute including information of the terms of the contract; and
transmitting a notification to the external entity of a modification of the terms of the contract and request approval of the modification in response to identifying that the change corresponds to the external attribute.

14. The computer-readable medium of claim 13, wherein the logic is further operable to change the purchase order to include the change in response to receiving approval from the external entity, defining a modified purchase order.

15. The computer-readable medium of claim 13, wherein the logic is further operable to:
receive approval from the internal entity; and
change the attribute for the purchase order document using the changed attribute.

16. The computer-readable medium of claim 13, wherein the logic is further operable to:
provide a change order form allowing a user to alter attributes of the purchase order.

17. The computer-readable medium of claim 13, wherein the logic is further operable to:
create a plurality of change order template definitions configured to identify the attributes that are internal or external; and
apply different change order template definitions to different purchase order.

18. The computer-readable medium of claim 13, wherein a change order definition in the plurality of change order definitions is associated with a type of purchase order and a business unit, wherein a purchase order created in the business unit and being the type of purchase order is automatically associated with the change order definition.

19. An apparatus comprising:
one or more processors; and
logic encoded in one or more tangible media for execution by the one or more processors and executable for:
rendering a plurality of attributes for one or more purchase orders on a display, with the one or more purchase orders defining terms of a contract between an external entity and an internal entity;
receiving input from a user interface associating the plurality of attributes as one of an internal attribute or an external attribute;
receiving a change order indicating a change to one of the plurality of attributes;
identifying, using one or more processors, whether the change corresponds to the external attribute or the internal attribute, with the external attribute including information of the terms of the contract; and
transmitting a notification to the external entity of a modification of the terms of the contract and request approval of the modification in response to identifying that the change corresponds to the external attribute.

* * * * *

UNITED STATES PATENT AND TRADEMARK OFFICE
CERTIFICATE OF CORRECTION

PATENT NO. : 8,271,361 B2
APPLICATION NO. : 12/388307
DATED : September 18, 2012
INVENTOR(S) : Nambiar et al.

Page 1 of 3

It is certified that error appears in the above-identified patent and that said Letters Patent is hereby corrected as shown below:

Delete title page and substitute the attached title page therefor.

Title page 2, in column 2, under "Other Publications", line 1, delete "mitedu" and insert -- mit.edu --, therefor.

Delete sheet 1 and substitute the attached sheet 1 therefor.

On sheet 1 of 6, in figure 1, Box 108, line 3, delete "mananger" and insert -- manager --, therefor.

On sheet 2 of 6, in figure 2, Box 204, line 4, delete "defintion" and insert -- definition --, therefor.

In column 6, line 20, delete "the a" and insert -- the --, therefor.

Signed and Sealed this
Nineteenth Day of March, 2013

Teresa Stanek Rea
*Acting Director of the United States Patent and Trademark Office*

(12) United States Patent
Nambiar et al.

(10) Patent No.: US 8,271,361 B2
(45) Date of Patent: Sep. 18, 2012

(54) CHANGE ORDER TEMPLATE FOR PURCHASE ORDER DOCUMENT AMENDMENT

(75) Inventors: Shibhu Nambiar, Annandale, VA (US); Suman Guha, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 473 days.

(21) Appl. No.: 12/388,307

(22) Filed: Feb. 18, 2009

(65) Prior Publication Data

US 2010/0211482 A1 Aug. 19, 2010

(51) Int. Cl.
*G07B 17/00* (2006.01)
*G06Q 30/00* (2012.01)
(52) U.S. Cl. ............................................. 705/30; 705/26
(58) Field of Classification Search .................... 705/30
See application file for complete search history.

(56) References Cited

U.S. PATENT DOCUMENTS

| | | | |
|---|---|---|---|
| 6,539,386 B1 * | 3/2003 | Athavale et al. | 1/1 |
| 7,096,189 B1 * | 8/2006 | Srinivasan | 705/7.25 |
| 2002/0178021 A1 * | 11/2002 | Melchior et al. | 705/1 |
| 2003/0126024 A1 * | 7/2003 | Crampton et al. | 705/22 |
| 2007/0106560 A1 * | 5/2007 | Shields | 705/26 |
| 2007/0203803 A1 * | 8/2007 | Stone et al. | 705/26 |
| 2010/0106546 A1 * | 4/2010 | Sproule | 705/7 |

OTHER PUBLICATIONS

"Business Process Document", GeorgiaFirst, document generation date Apr. 16, 2008.*

PeopleSoft EnterpriseOne—Revising a Procurement Document obtained at https://financial.gmis.in.gov/SOI/Pur/B4_PU_030.doc; 5 pages, Feb. 12, 2009.
BearingPoint—Project Aspire Conversion/Interface Functional Design obtained at http://www.fldfs.com/aadir/projectaspire/Resource_Documents/Functional_Specifications/p2p/087%20MFMP%20-%20PO%20Changes%20and%20Cancellations%20R4%20Final%20FSM5.pdf; 7 pages, Feb. 12, 2009.
PeopleSoft Navigation—Change a Purchase Order obtained at http://www.sparemouse.com/Portfolio/CSC_Education_Services/Pursell_Work/PSSupport/PS_UserGuide/po/05_manage_purchase_orders/05d_purchase_change_orders.htm; 6 pages, Feb. 12, 2009.
Georgia First—Business Process Document "Creating PO Change Orders" obtained at http://www.mcg.edu/peoplesoft/documents/PO_020_220-CreatingPOChangeOrders_BUSPROC.doc; 5 pages, Jun. 15, 2006.

(Continued)

*Primary Examiner* — Garcia Ade
(74) *Attorney, Agent, or Firm* — Trellis IP Law Group, PC

(57) ABSTRACT

Particular embodiments provide for a user configurable purchase order template. A list of attributes for a purchase order template may be created and output to a user. The user may then select which attributes in the list are internal attributes or external attributes. After the purchase order document has been approved by the supplier and the purchaser, changes may be necessary. When a change is desired, the system determines if the changed attribute is an external attribute or an internal attribute. If the changed attribute is an external attribute, the external entity may be contacted for approving the change. After the external entity has approved the change, the purchase order may be amended. If the changed attribute is an internal attribute, the attribute may be changed without contacting the external entity. If the change is an internal change, then the purchase order may not be amended, but an internal change relating to the purchase order may be made.

19 Claims, 6 Drawing Sheets